March 7, 1933.   E. PROTEAU   1,900,761
EGG POACHER
Filed May 27, 1931
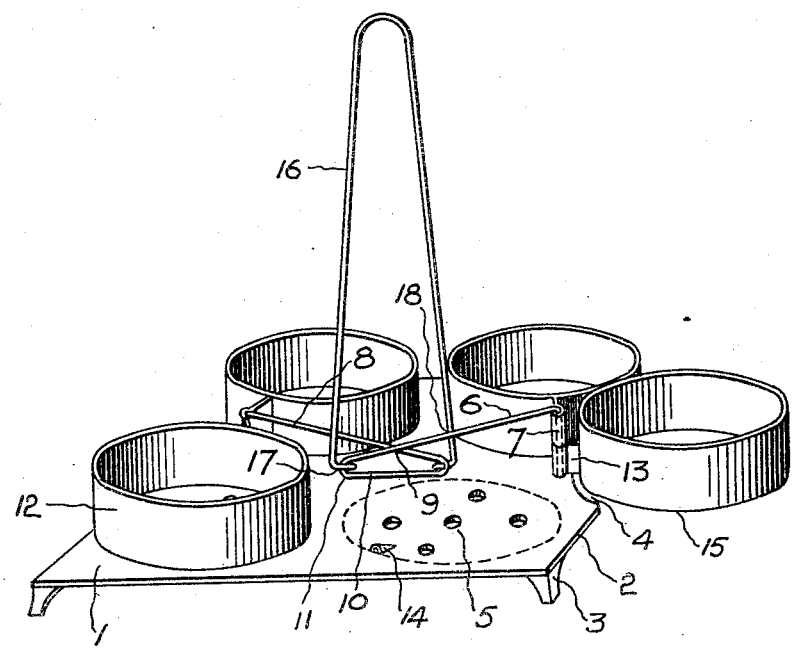
INVENTOR
(MRS.) ELIZABETH PROTEAU
BY
Fetherstonhaugh & Co
ATTORNEYS Patented Mar. 7, 1933

1,900,761

UNITED STATES PATENT OFFICE

ELIZABETH PROTEAU, OF VANCOUVER, BRITISH COLUMBIA, CANADA

EGG POACHER

Application filed May 27, 1931. Serial No. 540,297.

My invention relates to improvements in egg poachers, the objects of which are to provide means whereby the eggs after being poached may be conveniently discharged from the cooking utensil onto a plate without breaking the yolk of the egg or otherwise impairing its appearance, a further object is to provide in a device of this kind a freely detachable handle which when removed facilitates packing and therefore renders the device particularly suitable for use in auto camping and for picnics generally. A still further object is to provide a device wherein the egg containers are displaceable though not removable.

The invention consists essentially of a perforated plate supporting a plurality of annular rings which are pivotally mounted thereon and capable of being outwardly swung beyond the edge of said plate, as will be more fully described in the following specification and shown in the accompanying drawing.

The drawing is a perspective view of the invention.

The numeral 1 indicates a base plate of substantially rectangular form having ends 2 and mounted upon short legs 3 for the purpose of permitting a circulation of water below the plate. Opposing gaps 4 are formed intermediate the length of the ends which have a radius somewhat greater than the annular rings to be hereinafter described. The plate is provided with four sets of apertures 5 which serve as drains for water. A supporting member 6 extends along the longitudinal centre of the base plate 1 which is formed of wire bent as shown to provide a pair of vertical pins 7, secured to said plate a pair of sloping arms 8 which cross each other as at 9 and a horizontal portion 10 which connects with the arms 8 with a pair of U-bends 11.

Normally carried upon the plate are four annular rings 12 each of which is of a suitable size for receiving an egg and is provided with an exteriorly projecting hinge lug 13 which is pivotally connected to one of the pins 7 of the supporting member 6, the length of said lugs being such as to permit each ring to be swung from its normal position outwardly over its adjacent gap 4. As a means of retaining each ring against accidental displacement from its normal position, a stop 14 is provided in the base plate by indentation or otherwise, which is adapted to be engaged by the inner periphery of the ring, this stop is of such shallow projection as to permit the ring to be raised thereover with ease in order that it may be swung from the position indicated in dotted line to that shown in solid line as at 15.

A handle or bale 16 is formed from a piece of spring wire which is bent into the form of an inverted U having at each of its extremities a horizontally turned hook 17, these hooks are bent in opposite directions and are adapted to engage the bends 11 of the supporting member 6 and the upright portions of the bale bear against the sloping arms 8 as at 18, thus causing the handle to be supported in an upright position from the supporting member. The removal of the handle is accomplished by squeezing it to move the hooks 17 towards each other and slightly turning it so that it is removed from contact with the sloping arms 8.

In use, the device is placed in a pan of water in the usual manner and an egg is broken into each ring where it is retained until poached. When the cooking is completed the device is removed from the water and held over the article on which the eggs are to be deposited, and each ring 12 is swung outwardly as shown, when the egg will drop therefrom.

What I claim as my invention is:

1. An egg poacher comprising a plate having a vertical pivot pin adjacent one edge, a pair of rings pivotally mounted for individual movement about said pin, each ring being normally in contact with the plate and adapted to be swung beyond its borders, and a handle for lifting the plate and its rings.

2. An egg poacher comprising a plate having a gap in one of its borders, a vertical pivot pin carried by the plate adjacent said gap, a pair of rings pivotally mounted for individual movement about said pin, each ring being normally in contact with the plate and adapted to be swung outwardly above said gap, and a handle for lifting the plate and its rings.

3. An egg poacher comprising a substantially rectangular plate having a pair of vertical pivot pins upon the plate, a pair of rings pivotally mounted for individual movement about each of said pins, each of said rings being normally in contact with the plate and adapted to be swung beyond its borders, and handle for lifting the plate and its rings.

4. An egg poacher comprising a plate having a pair of spaced pivot pins secured thereto and to each other by a connecting member, pairs of rings normally in contact with the plate pivotally connected to said pins for individual movement outwards to positions beyond the borders of said plate, and a spring handle member detachably secured to the connecting member for lifting the plate and its rings.

Dated at Vancouver, B. C., this 19th day of May, 1931.

ELIZABETH PROTEAU.